US005724455A

United States Patent [19]
Eschbach

[11] Patent Number: 5,724,455
[45] Date of Patent: Mar. 3, 1998

[54] AUTOMATED TEMPLATE DESIGN METHOD FOR PRINT ENHANCEMENT

[75] Inventor: Reiner Eschbach, Webster, N.Y.

[73] Assignee: Xerox Corporation, Stamford, Conn.

[21] Appl. No.: 169,483

[22] Filed: Dec. 17, 1993

[51] Int. Cl.[6] ................................................. G06K 9/40
[52] U.S. Cl. ........................................... 382/260; 358/445
[58] Field of Search ............................ 382/54, 56, 33, 382/260, 261, 209, 205; 358/451, 445, 450, 453; 364/724.01

[56] References Cited

U.S. PATENT DOCUMENTS

| | | | |
|---|---|---|---|
| 4,437,122 | 3/1984 | Walsh et al. | 358/166 |
| 4,460,909 | 7/1984 | Bassetti | 346/160 |
| 4,544,264 | 10/1985 | Bassetti et al. | 355/14 R |
| 4,544,922 | 10/1985 | Watanabe et al. | 340/728 |
| 4,625,222 | 11/1986 | Bassetti et al. | 346/160 |
| 4,814,890 | 3/1989 | Kato | 358/280 |
| 4,841,375 | 6/1989 | Nakajima et al. | 353/280 |
| 4,847,641 | 7/1989 | Tung | 346/154 |
| 4,933,689 | 6/1990 | Yoknis | 346/154 |
| 5,005,139 | 4/1991 | Tung | 364/519 |
| 5,029,108 | 7/1991 | Lung | 364/519 |
| 5,134,495 | 7/1992 | Frazier et al. | 358/298 |
| 5,138,339 | 8/1992 | Curry et al. | 346/108 |
| 5,142,374 | 8/1992 | Tajika et al. | 358/298 |
| 5,150,311 | 9/1992 | Long et al. | 395/108 |
| 5,161,035 | 11/1992 | Muramatsu | 358/451 |
| 5,193,008 | 3/1993 | Frazier et al. | 358/298 |
| 5,206,741 | 4/1993 | Shimura et al. | 358/404 |
| 5,293,254 | 3/1994 | Eschbach | 358/445 |
| 5,359,423 | 10/1994 | Loce | 358/296 |

FOREIGN PATENT DOCUMENTS

0177640  4/1986  European Pat. Off. ......... G06F 15/16

OTHER PUBLICATIONS

James C. Stoffel et al. *A Survey of Electronic Techniques for Pictorial Image Reproduction*, IEEE Transactions on Communications, vol. COM-29, No. 12, Dec. 1981.

L. Steidel *Technology Overview: Resolution Enhancement Technologies for Laser Printers*; LaserMaster Corp., Sep. 1991.

Robert P. Loce et al. *Facilitation of Optimal Binary Morphological Filter Design via Structuring Element Libraries and Design Constraints*, Optical Engineering, vol. 31, No. 5, May 1992, pp. 1008–1025.

Edward R. Dougherty ed, Marcel Dekker 1992, *Mathematical Morphology in Image Processing*, pp. 43–90.

Robert P. Loce et al., *Optimal Morphological Restoration: The Morphological Filter Mean–Absolute–Error Theorem*, Journal of Visual Communications and Image Representation, (Academic Press), vol. 3, No. 4, Dec. 1992, pp. 412–432.

Edward R. Dougherty et al., *Optimal mean–absolute–error hit–or–miss filters: morphological representation and estimation of the binary conditional expectation*, Optical Engineering, vol. 32, No. 4, Apr. 1993, pp. 815–827.

Donald L. Ort *Character Edge Smoothing For Matrix Printing*, Xerox Disclosure Journal, vol. 6, No. 1, Jan./Feb. 1981, p. 19.

XDJ, vol. 5, No. 1, Jan./Feb. 1980, pp. 115–116.

(List continued on next page.)

*Primary Examiner*—Jose L. Couso
*Assistant Examiner*—Matthew C. Bella
*Attorney, Agent, or Firm*—Duane C. Basch

[57] ABSTRACT

The present invention is a method for automating the design of pattern matching templates used to implement a print quality enhancement filter. More particularly, the method is directed to the use of a representative set of page description language decomposed training documents, and statistical data derived therefrom, in an automated process which generates templates for resolution enhancement and/or conversion of bitmap images.

18 Claims, 6 Drawing Sheets

Microfiche Appendix Included
(2 Microfiche, 167 Pages)

OTHER PUBLICATIONS

Torrey Pines Research, *Behind Hewlett–Packard's Patent on Resolution Enhancement Technology*, (Becky Colgan ed., BIS CAP Int'l 1990) pp. 1–60.

DP–Tek, Inc., *True Res Resoution Transformation Technology*, 6 pages, May 27, 1993.

Adam L. Carley, PhD., *Resolution Enhancement in Laser Printers*, XLI Corp. Woburn, Mass., 1993, pp. 1–16.

Robert P. Loce, *Morphological Filter Mean–Absolute–Error Representation Theorems and Their Application to Optimal Morphological Filter Design*, Center for Imaging Science, Rochester Institute of Technology, (PhD. Thesis) May 1993.

AUTOMATED TEMPLATE DESIGN METHOD FOR PRINT ENHANCEMENT

This invention relates generally to a method for automating the design of pattern matching templates for print quality enhancement, and more particularly to the use of training documents, and statistical data derived therefrom, in an automated process which generates templates for resolution enhancement and/or conversion of bitmap images.

CROSS REFERENCE

The following related applications are hereby incorporated by reference for their teachings:

"Image Resolution Enhancement Using Statistically Generated Look-Up Tables," Loce et al., Ser. No. 08/169,485, filed concurrently herewith;

"Non-Integer Image Resolution Conversion Using Statistically Generated Look-Up Tables," Loce et al., Ser. No. 08/170,082, filed concurrently herewith;

"Method for Statistical Generation of Density Preserving Templates for Print Enhancement," Loce, Ser. No. 08/169,065, filed concurrently herewith; and "Image Resolution Conversion Method that Employs Statistically Generated Multiple Morphological Filters," Loce et al., Ser. No. 08/169,487, filed concurrently herewith.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the Patent and Trademark Office patent file or records, but otherwise reserves all copyright rights whatsoever.

MICROFICHE APPENDIX

An Appendix comprising 2 microfiche having a total of 167 frames thereon is included as part of this application.

BACKGROUND AND SUMMARY OF THE INVENTION

Information systems for handling numerous document and data formats are moving towards becoming open systems where different devices are tied to one another to provide solutions to customers' needs. A key factor in such open systems is enabling an electronic document to be printed so that the customer does not perceive any difference between versions printed on different output devices. In order to achieve complete device-independence, efficient methods of accurately altering image resolution and enhancement are required to take advantage of the technology. Hence, raster conversion technology, where a bitmap created on or for a first device is altered so as to be printable on a second output device, has become an important aspect of the open system technology.

Another important aspect is the preservation of the investment in technologies, while improving printers and print appearances. A common example for this case is the storage of fonts, forms, etc. in the form of bitmaps at a specified resolution, say 300×300 spots per inch (spi). With improving print engines, output resolutions of 600×600 spi, 300×1200 spi and the like are possible. However, existing applications using, for example, 300×300 spi fonts have to be handled by these new output devices at a quality level that exceeds that of the 300×300 spi output devices.

The present invention is a method for generating resolution enhancement filters in the form of templates that may be efficiently employed in look-up tables or logic operations. The enhancement filters operate on image bitmaps to improve document appearance by converting from an original resolution to an output resolution of the printing or display device, at an integer multiple in each direction of the input resolution. The resulting image signals may then be used to drive devices at the output resolution without impacting spatially sensitive features within the input image. The templates produced using the present invention may be utilized to control a printing device having a scanning beam, where the beam varies in intensity and duration according to the pulses used to control it. As another example, a cathode ray tube uses an electron beam to scan a phosphorous screen. The electron beam may be varied in intensity and duration to accurately display information on the phosphor screen. In both examples, a pulse forming circuit responsive to the output image signal may be used to generate video pulses to control the intensity and operation time of the respective beams.

Previously, various methods and apparatus have been used to alter the resolution of bitmapped images. The following disclosures may be relevant:

U.S. Pat. No. 4,437,122 to Walsh et al. teaches an improved method of converting low resolution images into images of higher resolution for printing so as to simultaneously increase density and smooth character edges. In a CRT display or hardcopy output apparatus, the invention is accomplished by converting an original pixel into a higher resolution 3×3 enhanced representation. The status of each of the nine elements in the enhanced representation is determined as a result of an examination of the neighboring pixels of the original pixel.

U.S. Pat. No. 4,544,264 and U.S. Pat. No. 4,625,222, both issued to Bassetti et al. describe enhancement circuits suitable for use in a laser based electrophotographic printing machine. The enhancements are directed at modifying the digital drive signals used to produce the image, including smoothing digitized edges and broadening fine lines in both the horizontal and vertical directions. Leading and trailing edge signals, in both directions are provided to potentially print each black pixel or line as a series of three pixels, a gray leading pixel, overlapped by a central black pixel, which is in turn overlapped by a gray trailing pixel. A similar process is applied for scan lines as well. The series of signals are recombined to effectively control the voltage and current levels of a laser driver.

U.S. Pat. No. 4,690,909 to Bassetti discloses a method and apparatus for enhancing the apparent resolution of electrophotographic printers using a gray dot replacement technique to enhance low resolution output. More specifically, gray or halftone halos are produced along image edges to provide smoothing, while reducing the width of the image regions to avoid thickening thereof as a result of the halo.

U.S. Pat. No. 4,841,375 to Nakajima et al. discloses an image resolution conversion apparatus which converts image data having a predetermined pixel density to a pixel density matching that of a printer so as to enable printing by the printer. The pixel density converter includes: a conversion-pixel position detector for detecting the position of a converted pixel; an original-pixel extractor for extracting a reference original pixel; a conversion-pixel density operation circuit for calculating the density of a conversion pixel; a threshold-value setter for dynamically setting a threshold value; a binary encoding circuit for digitizing the conversion-image density; an input interface for inputting image data; an output interface for outputting image data; and a control circuit for controlling the input/output (I/O) and the conversion operations.

U.S. Pat. No. 4,847,641 and U.S. Pat. No. 5,005,139 to Tung disclose print enhancement circuitry for a laser beam printer. The bit map of a region of the image to be output is compared to a number of patterns or templates. When a match is detected, a section of the bitmap which was matched is replaced with a unique bitmap section designed to compensate for errors. The replacement bitmap section may include predetermined shifting of some dot positions to compensate for the error in the original bitmap section.

U.S. Pat. No. 5,029,108 to Lung teaches an edge enhancement method and apparatus for dot matrix devices wherein a group of gradient mask matrices are applied to a matrix of pixels surrounding a "to be adjusted pixel" so as to determine the existence of an edge and the direction of the brightness change. Once determined, the factors are used to generate a code used to modify the to be adjusted pixel in order to enhance the smoothness of a segment transition.

U.S. Pat. No. 5,134,495 to Frazier et al. discloses a laser based imaging system which employs a resolution transformation method. The method uses the selective activation in overlapping areas between rasters (scan lines). In one embodiment, a single interleaved pixel, between two scan lines, is formed by the sum of up to six laser pulses at pixel points on adjacent scan lines. In some cases the laser pulses are of insufficient intensity to produce a dot or mark at the point on the scan line where the center of the pulse is received.

U.S. Pat. No. 5,150,311 to Long et al. discloses a system for producing print-dot data suitable for driving a hardcopy printing device. More specifically, the print-dot data is selectively obtained from a conversion operation carried out by a matrix and dot generator combination which respectively generate subtractive color components and a pattern of high resolution print-dots therefrom.

U.S. Pat. No. 5,193,008 to Frazier et al. further describes the resolution enhancement apparatus as one which includes the ability to rasterize the image to be printed at twice the resolution of the printer. The printer then outputs the higher resolution image using an interleaving technique which generates developable dots between scan lines by energizing corresponding dots on adjacent scan lines at a level which will not be developed, but where the overlapping portion of the two corresponding dots will be developable.

U.S. Pat. No. 5,206,741 to Shimura et al. discloses an image processing apparatus for processing image data to be output by a printing unit. A conversion unit converts pixel image data within an image memory into data having a resolution equal to the output resolution of the print mechanism.

U.S. application Ser. No. 07/513,415), and the corresponding Japanese laid-open patent publication 4227584 published Aug. 17, 1992, to Mailloux et al. disclose a method to enable the conversion of binary image data originally generated at a lower resolution into representative binary image data of a higher resolution, wherein the conversion ratio, or magnification factor, is an integer value. Included within the resolution magnification invention are methods for smoothing the interpolated output image and thereby reducing objectionable visual characteristics observable in digitally encoded data using conventional magnification techniques.

A number of the previously described patents and publications are summarized in Torrey Pines Research, *Behind Hewlett-Packard's Patent on Resolution Enhancement® Technology*, (Becky Colgan ed., BIS CAP International, 1990) pp. 1–60, including concepts associated with resolution enhancement.

James C. Stoffel et al. in *A Survey of Electronic Techniques for Pictorial Image Reproduction*, IEEE Transactions on Communications, Vol. COM-29, No. 12, December 1981, incorporated by reference for its teachings, discloses image processing algorithms that can be used to transform continuous tone and halftone pictorial image input into spatially encoded representations compatible with binary output processes.

Robert P. Loce et al. in *Facilitation of Optimal Binary Morphological Filter Design via Structuring Element Libraries and Design Constraints*, Optical Engineering, Vol. 31, No. 5, May 1992, pp. 1008–1025, incorporated herein by reference, describes three approaches to reducing the computational burden associated with digital morphological filter design. Although the resulting filter is suboptimal, imposition of the constraints in a suitable manner results in little loss of performance in return for design tractability.

In accordance with the present invention, there is provided a method for automatically creating a template-based filter to be used for filtering of an image bitmap, comprising the steps of:

(a) generating a first resolution image from a training document and storing the first resolution image in a first bitmap memory;

(b) generating a second, resolution image from the training document and storing the second resolution image in a second bitmap memory;

(c) defining an input template window which may be passed through the first bitmap memory;

(d) defining an output pattern window which may be passed through the second bitmap memory, so that the position of the output pattern window within the second bitmap memory is a function of the position of the input template window within the first bitmap memory;

(e) storing, in a database memory, occurrences of pixel combinations occurring within the input template window and corresponding occurrences of pixel combinations occurring within the output pattern window as the input template window is passed through a plurality of positions within the first bitmap memory; and (f) deriving, from the database memory, a set of template-pattern pairs which form the template-based filter, wherein each output pattern is representative of a pixel pattern to be generated in response to the detection of a pattern of pixels within a corresponding input template.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENT

For a general understanding of the operation of the present invention, reference is made to the drawings. In the drawings, like reference numerals have been used throughout to designate identical elements. The terms image signal, video data, and pixel are used herein to describe discrete digital signals which represent the active (on) or inactive (off) state of an element within a digital image. In addition, shaded or cross-hatched portions of image bitmaps depicted herein are intended to represent black or active pixels (having a value of 1) within the bitmaps. Such a representation is not intended to limit the present invention, but to simplify the description thereof.

Figure 1:
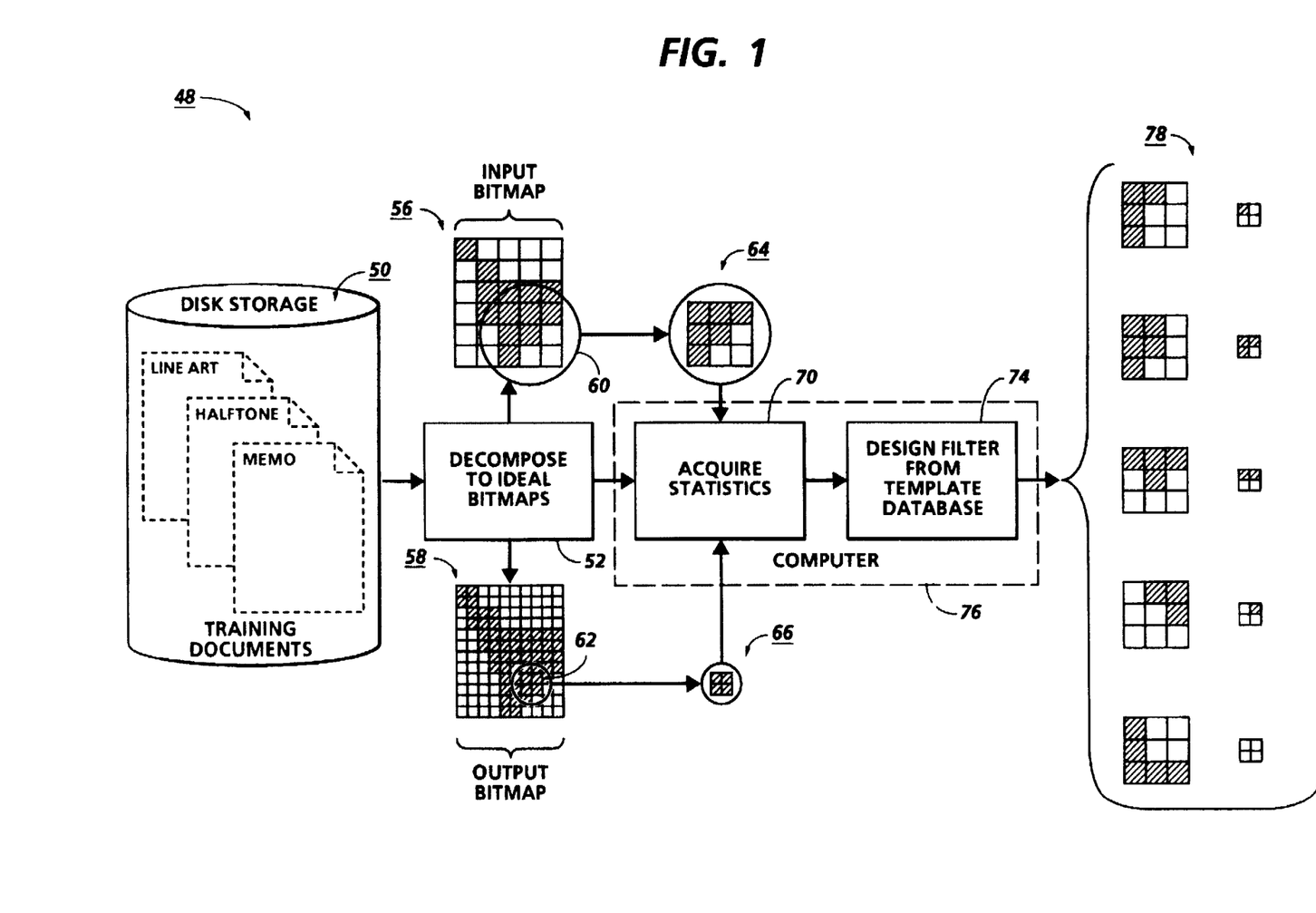
FIG. 1 is a block diagram of a hardware embodiment suitable for implementing the present invention.

FIG. 1 shows a block diagram of a hardware embodiment suitable for carrying out the present invention. Many aspects of the present invention may be accomplished or simulated using a programmable computer. Accordingly, the Appendix incorporated as part of this specification includes software code listings which were used to implement one or more steps in the present invention.

In FIG. 1, a set of training documents 50, which are preferably electronic documents stored on magnetic disk or similar media, are initially chosen as representative of printed matter that will be generated by the printer. These training document are then digitized, or more appropriately, decomposed at block 52 into a pair of bitmaps 56 and 58. Input bitmap 56 represents the image at a first or input bit resolution (M), whereas output bitmap 58 represents the image at a second (printer) or output bit resolution (N), where the present invention will enable an M-to-N resolution enhancement.

Figure 2:
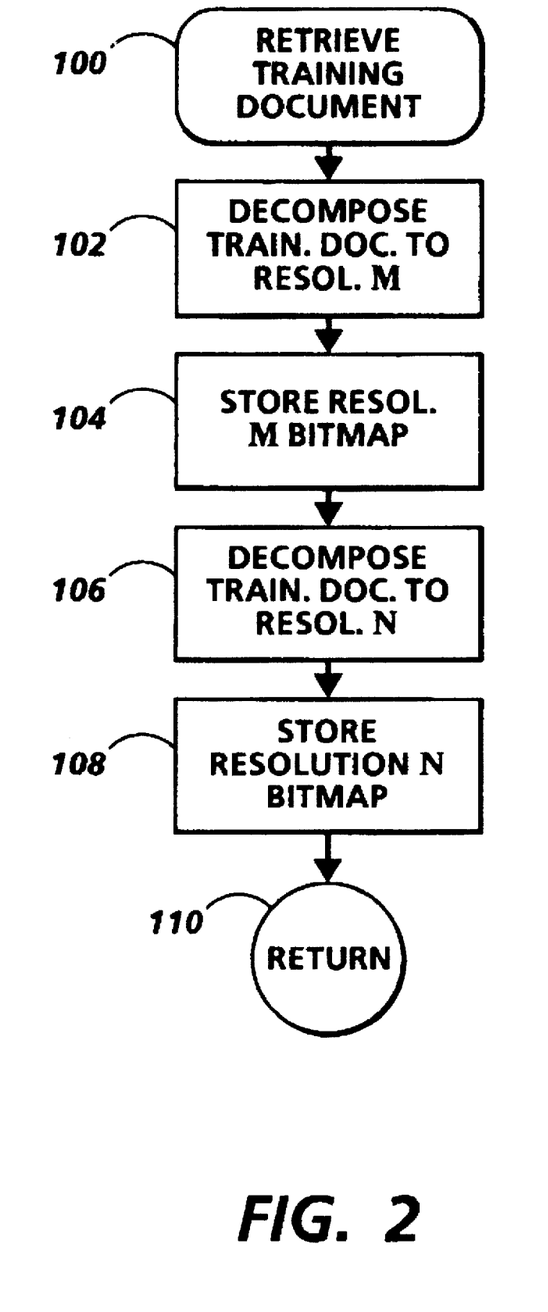
FIG. 2 is a flowchart detailing a portion of the process used to decompose documents in accordance with the embodiment depicted in FIG. 1.

As illustrated in the flowchart of FIG. 2, the decomposition process of block 52 occurs by performing a series of operations to render printable bitmaps from one or more training documents 50. The decomposition process could be performed on a general purpose computer platform, or may be accomplished by commercially available page decomposition hardware which is commonly employed in laser-based printing machines available for personal and office use. The training documents, which are preferably documents stored in a page description language (PDL) such as Postscript® (Adobe) or Interpress® (Xerox) are transformed to bitmap representations by the hardware and/or software systems commonly employed in printers capable of receiving such input. As an example, a commonly known Postscript® decomposer could be employed to transform the training document input thereto into a series of digital signals representing the bit stream necessary to drive a 300 spot per inch (spi) printer.

The process steps accomplished at bitmap decomposition block 52 start with the retrieval of a training document from the storage media, step 100. Once retrieved, the training document would be stored in temporary memory and supplied to a decomposer at step 102, implemented in either software or hardware as described above. At the decomposer, the training document is decomposed to produce a bitmap at a first resolution M, for example 300 spi. This first resolution bitmap is indicative of the input bitmap expected in the application. In other words, if the printer currently used in the application is a 300×300 spi printer having certain characteristics, the bitmap decomposition is done to the 300×300 spi bitmap, optionally including all or part of the printer characteristics. As it is decomposed, the resulting M resolution bitmap is stored in a first bitmap memory, step 104, as illustrated in FIG. 1 as input bitmap 56. Next, a second resolution bitmap is generated in a similar fashion, where the training document is decomposed to produce a bitmap at a second resolution N, for example 600 spi, at step 106. Here, the second resolution bitmap is indicative of the output device expected in the application. For example, if the printer to be used in the application is a 600×1800 spi printer having certain characteristics, the bitmap decomposition is done to the 600×1800 spi bitmap, optionally including all or part of the printer characteristics. As it is decomposed, the resulting N resolution bitmap is stored in a second bitmap memory, step 108, and as illustrated in FIG. 1 as output bitmap 58.

In a preferred embodiment, the decomposition operation would be carried out for a number of training documents so as to build numerous sets of corresponding input and output bitmap image pairs at the respective M and N resolutions. While not depicted as such in FIG. 1, it should be noted that the resolution of output bitmap 58 may be anamorphic or may consist of multiple bit per pixel representations so as to enhance the resolution of the output image. For example, the slow scan resolution may be the same in the two bitmaps while the resolution in the fast scan direction is a multiple of the input resolution (M). Once the decomposition has been completed for input and output resolutions M and N, respectively, the process continues at acquire statistics block 70 of FIG. 1.

As illustrated in FIG. 1, the general operation of acquire statistics, block 70, and designing the filter, block 74, are preferably accomplished by a computer 76. In general, the acquire statistics block sequentially moves a pair of windows 60 and 62 through the input and output bitmaps, respectively, to locate the corresponding pixel combinations that are produced by the decomposition block for identical regions of the target document. While locating the corresponding input and output combinations, block 70 stores the combinations in a database and collects statistics on the combinations.

Figure 3:
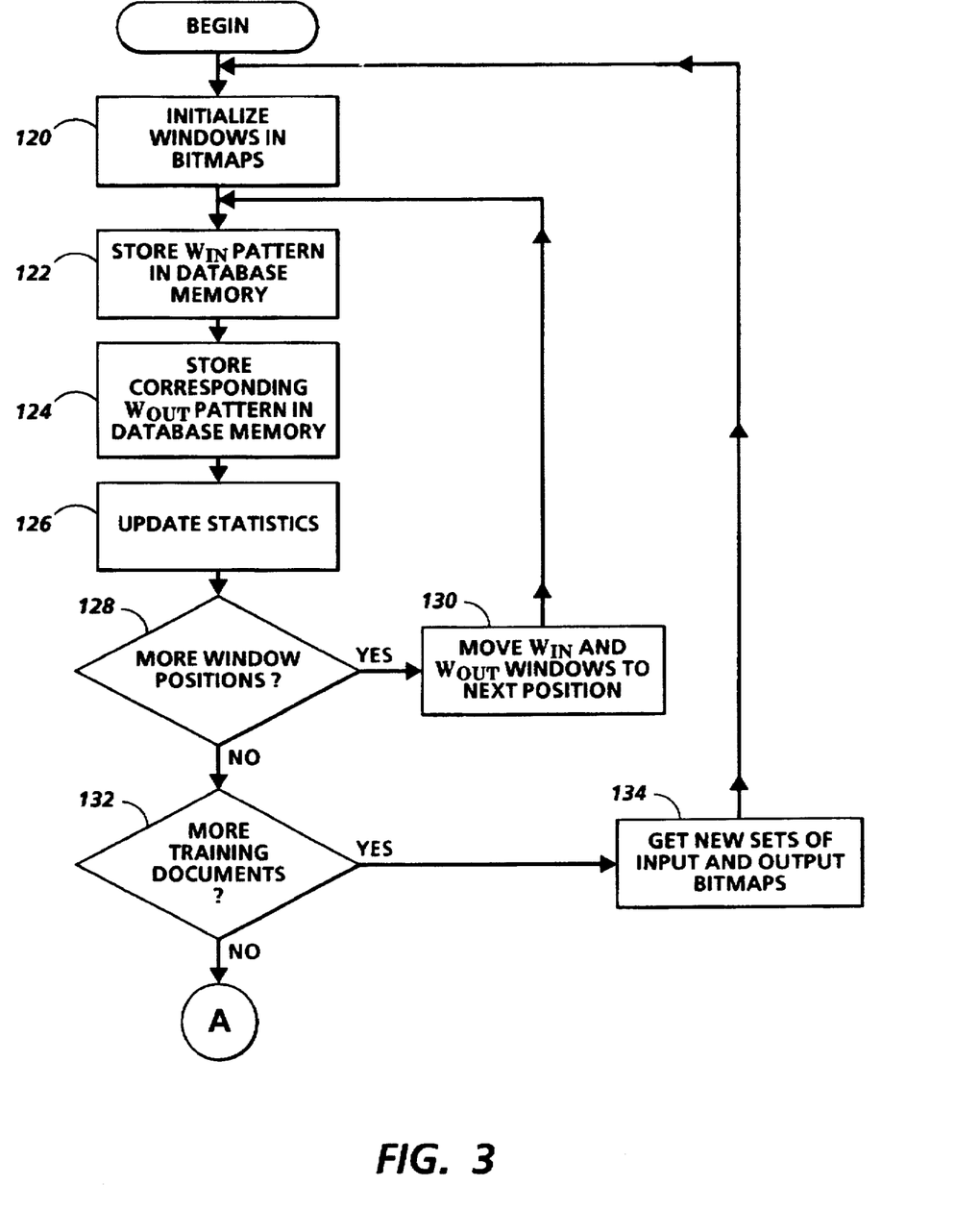
FIG. 3 is a flowchart detailing a portion of the process used to acquire statistics on the decomposed bitmaps in accordance with the embodiment depicted in FIG. 1.
Figure 4:
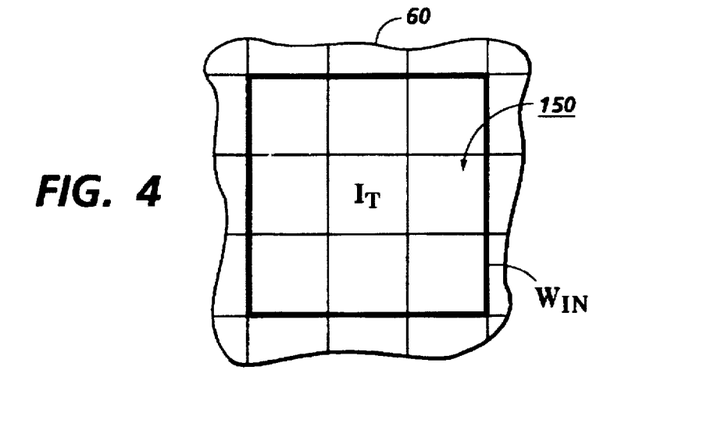
FIGS. 4 and 5 respectively illustrate corresponding positions of the image bitmaps generated by the decomposition operation detailed in FIG. 2.
Figure 5:
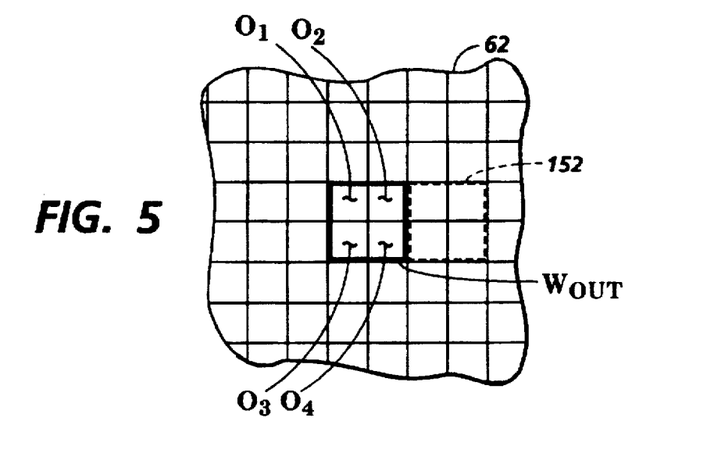
Figure 6:
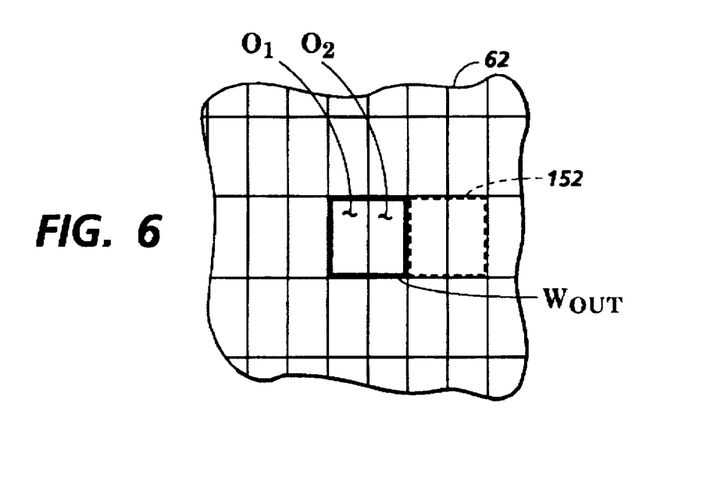
FIG. 6 illustrates an alternative correspondence for an output window having different resolutions in the fast and slow scan direction.

The operation of acquire statistics block 70 is further illustrated in FIG. 3 where a flowchart depicts the processing steps accomplished by the acquire statistics block. Initially, template and pattern windows are established within both the first and second resolution bitmaps, respectively, step 120. As illustrated in FIGS. 4 and 5, respectively, the input bitmap or template window $W_{IN}$, encloses a plurality of input pixels surrounding an input pixel position $I_T$, while the output pattern window $W_{OUT}$, encloses a series of output pixel positions $O_i$. The example illustrated in FIGS. 4 and 5 is representative of an M-to-N transition where N=2M (i.e.:i=4). Thus, for every target input pixel position $I_T$, four output pixels ($O_1$-$O_4$) would have been created within the output bitmap. Similarly, FIG. 6 depicts the example for an anamorphic output resolution, where N=M for the fast scan and N=2M for the slow scan direction. In this case, two output pixels $O_1$ and $O_2$,i=2, are generated for each input pixel. As yet another alternative, a larger input window $W_{IN}$ may be used to provide more context for the transformation. Also, pixels for more, or fewer, output pixel positions (i.e., a different sized or shaped output pattern window, $W_{OUT}$) may be generated in association with the input window.

Returning to FIG. 3, once the template and pattern windows have been established, the pattern of pixels within both windows (e.g., the template representing the binary states of the pixels in a window) are associated with one another and an entry representing the pixel patterns occurring in the window pair is stored in a database, as represented by steps 122 and 124, assuming that an identical pair (same $W_{IN}$ pattern and $W_{OUT}$ pattern) has not been previously detected. If an identical pair is already in existence in the database, an additional field associated with the database entry for the pair may be incremented, step 126, to indicate that another occurrence of the pair was detected. Such a field avoids storage of all pairs in the database and subsequent parsing to remove the identical pairs from the database. As an example, the following is a partial representation of the database entries for a 3×3 input window with the listing starting in the top left corner and a 2×2 output window, i.e. a resolution enhancement of 2× in the fast and slow scan direction:

|   | INPUT     | OUTPUT | Occurrences |
|---|-----------|--------|-------------|
| 1 | 011001001 | 1101   | 39          |
| 2 | 011011001 | 1101   | 17          |
| 3 | 011011001 | 0101   | 3           |
| 4 | 001011111 | 0111   | 12          |

Once the template pair has been handled, step 128 executes a test to determine if there remain further pixel positions within the first and second resolution bitmaps that have not been processed. If so, step 130 causes the position of windows $W_{IN}$ and $W_{OUT}$ to be advanced to corresponding locations in their respective bitmaps. For example, window $W_{IN}$ would be moved so that the target input pixel position $I_T$ is located at a horizontally adjacent pixel position 150 in FIG. 4, output window $W_{OUT}$ would be moved horizontally to the position indicated by reference numeral 152, and the process steps 122 through 128 would be repeated.

Similarly, step 132 determines if the database being compiled is complete by testing whether the bitmaps generated from all the training documents have been exhausted. If not, the previously described process is repeated for any remaining input and output bitmap pairs. Otherwise, the generation of the template database entries and compilation of statistics is complete.

In general, the basic design of the filters is also complete at this point, leaving the tasks of optimizing the database entries and resolving conflicts to produce the final filter design, block 74. Once the previously described operations of block 70 are complete, there exists a database of input patterns or templates at resolution M that may be used to generate output pixel patterns at resolution N, where the structure or arrangement of the output pixels is one that is determined from the template database entry; the pattern contained within the output window $W_{OUT}$ being determined as a function of the input window pattern.

This approach has the advantage that only a small subset of all possible bitmap combinations of the input window $W_{IN}$ will create a database entry, since the majority of possible bitmap combinations over a window of size $W_{IN}$ does not occur in standard documents. In manual systems, either all possible patterns have to be searched (e.g.512 possible patterns for a 3×3 window, 225 patterns for a 5×5 window, or 249 patterns for a 7×7 window) or an expert guided reduction of the possible input patterns has to be performed. The described invention dramatically reduces the search space and eliminates the need for expert reduction by using real document instances to guide the input pattern selection.

Figure 7:
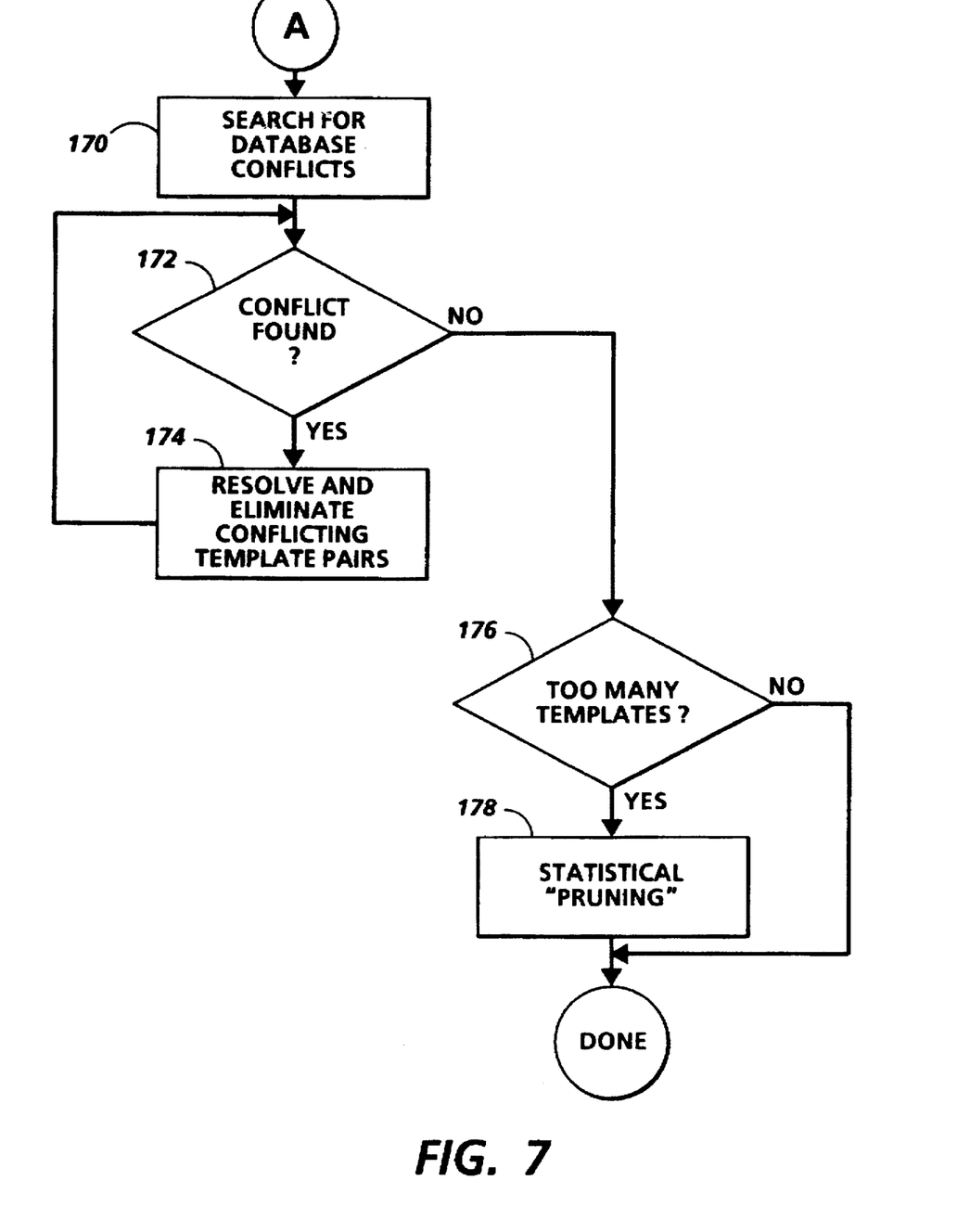
FIG. 7 is a flowchart illustrating various aspects of the process used to automatically design the enhancement filter in accordance with the present invention.

As illustrated in the flowchart of FIG. 7, the database is first searched for conflicts, step 170, where one pattern of input pixels within $W_{IN}$ has generated more than one output pattern in $W_{OUT}$. It is important to note that a simple replication of the input pattern may be a valid output pattern. When a conflict is found at step 172 (e.g., entries 2 and 3 above), the default mode is that all conflicts are resolved by simply using a N/M scaled version of the input pattern as the output. Such a decision may also be used to further reduce the size of the template database necessary to implement the resolution enhancement operation, because there is no need to store the cases that are simply scaled representations of the target pixel $I_T$. Preferably, the conflict is resolved using the output pattern that has the highest frequency of occurrence for the conflicting input pattern in the test document, step 174. This method preserves the structure of the decomposed bitmap images to the greatest extent possible when the conflict situation arises.

Additionally, a "pruning" of the number of generated templates pairs may be required to further reduce the number of possible input filters. As represented by testing step 176, whenever the number of template pairs exceeds a threshold which represents a practical implementation limit, the number of possible template pairs may be further reduced or "pruned" as represented by step 178. For example, a 3×3 window generates up to 512 possible templates, and a 7×7 window up to 249 templates; clearly the latter, and possibly even the former, prohibits practical implementation in a hardware device seeking to minimize memory used for storage of such templates.

Recognizing that the maximum number of templates is not likely to be generated by analysis of the decomposed bitmaps, since only the input template patterns actually occurring in the training documents will be produced, this pruning can be achieved automatically by an order statistic operation. More specifically, those input template patterns that were detected most frequently within the input bitmaps analyzed will be retained, while the less frequently occurring template patterns will be eliminated from the database so as to reduce the size thereof. In the event an input pattern not maintained within the database is detected, the default would be to merely replicate the target pixel at the new resolution N. Ultimately, block 74 produces a series of input template—output pattern pairs 78 as seen in FIG. 1.

The software listings in the microfiche Appendix have been developed to implement the previously described template design process. Briefly, the program takes two input images, one at the resolution and quality of the proposed input images and a second at the resolution and quality of the desired output images. The user must specify the respective resolutions, and the program, in its current state, requires that the output resolution be an integral multiple of the input resolution.

The reference window is the window of pixels that will be used to compare the two images, and is given with respect to the input image. For example, if a 3×3 reference window is defined to an input image of 300×300 spi, and the output image is at a resolution of 600×600 spi, then the reference window for the output image would be 6×6, with each pixel of the output image being a quarter the size of the input image pixel. This program also refers to a "Window" and "Subwindow". The Window refers to the window of pixels that will be captured and stored whenever information is put into the template database. The Subwindow refers to the portion of the Window that is used to compare the two images. The Subwindow may consist of the entire Window.

When the program has all the information necessary to process the two images, the user activates the "DoIt" icon, and the process begins. The process consists of starting at the beginning of each image, and comparing the respective regions of the images. If the two portions of the images are the same, then this information is not relevant and thus is not stored in the database. If the two portions differ in the center pixel, then this means that something has been changed in the output image to improve its quality, so this information is significant and must be saved in the database. This window for comparing then gets shifted one pixel, and the whole process is started again. When the end of a line or raster of image data is reached, the window is shifted by one scan line, and the process begins again at the start of the line until the end. In this way, every pixel in the image has the opportunity to be the center pixel and be tested for difference. The information that is stored in the database is further explained in the file sys_gen.h beginning on page 71 of the Appendix.

Figure 8:
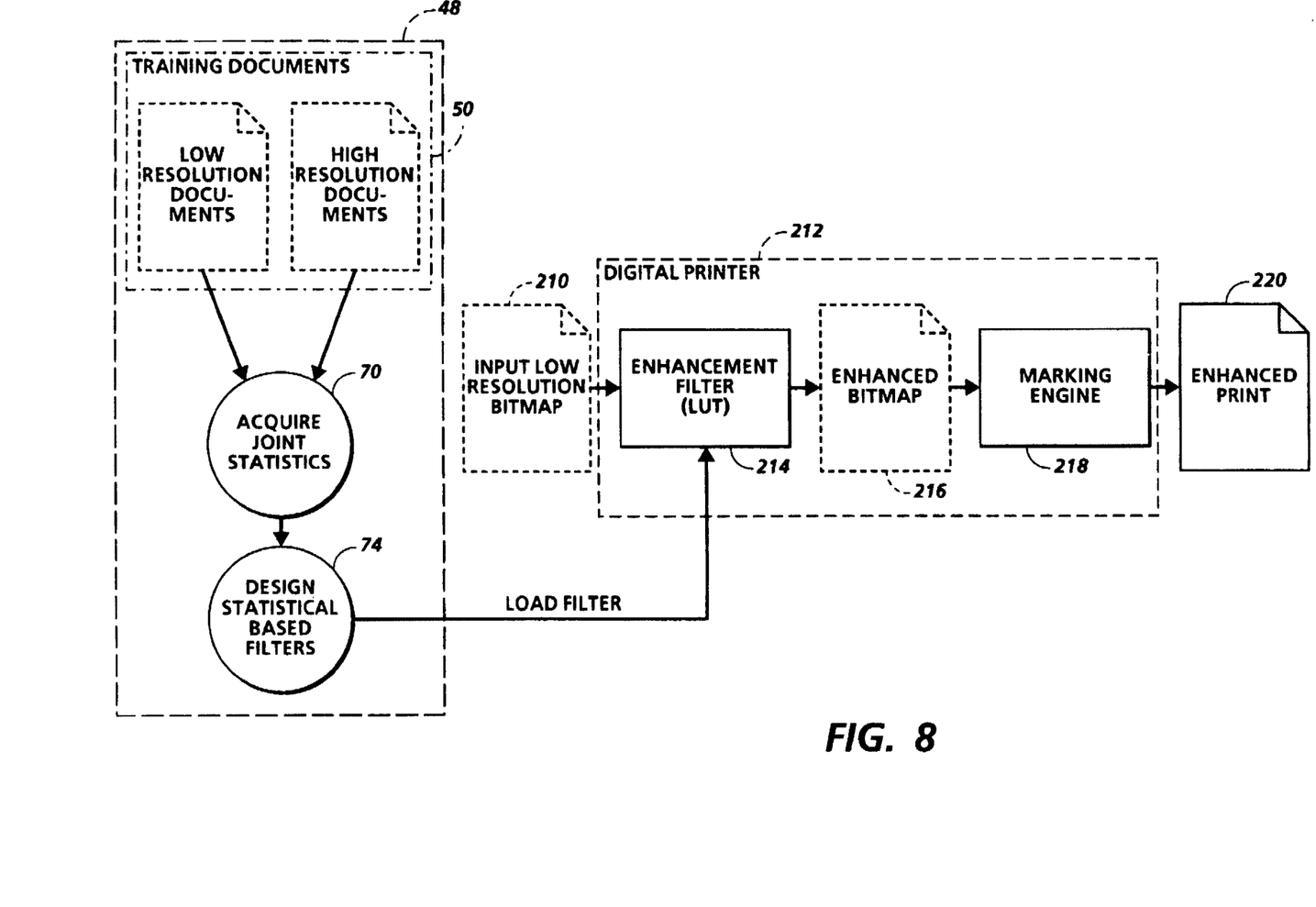
FIG. 8 is a block diagram illustrating the various stages in the process used to design the resolution conversion/enhancement filters of the present invention and further illustrating how such filters may be employed in a digital printer.

Turning now to FIG. 8, once the filters have been designed (FIG. 1, block 70 & 74), by design process 48 a set of statistically designed enhancement filters may be applied by the digital printer 212. More specifically, a low resolution bitmap image 210 would be presented to a digital printer 212 to produce printed output. Within a digital printer employing the resolution enhancement filter produced by the present invention, enhancement filter 214 transforms the input bitmap into an enhanced bitmap image 216. The enhanced bitmap image is then passed to marking engine 218 for exposure and development, for example, as described in the copending application for "Image Resolution Enhancement Using Statistically Generated Look-Up Tables," Loce et al., Ser. No. 08/169,485, previously incorporated by reference, to produce enhanced output print 220.

In recapitulation, the present invention is a method for automating the design of pattern matching templates used to implement a print quality enhancement filter, and more particularly to the use of training documents, and statistical data derived therefrom, in an automated process which generates templates for resolution enhancement of bitmap images.

It is, therefore, apparent that there has been provided, in accordance with the present invention, a method for automating the design of pattern matching templates useful in image resolution enhancement. While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method performed in a programmable computer for automatically creating a template-based filter to be used for filtering of an image bitmap, comprising the steps of:

(a) generating a first resolution image from a training document and storing the first resolution image in a first bitmap memory of the programmable computer;

(b) generating a second resolution image from the training document and storing the second resolution image in a second bitmap memory of the programmable computer;

(c) defining an input template window which may be passed through the first bitmap memory;

(d) defining an output pattern window which may be passed through the second bitmap memory, so that the position of the output pattern window within the second bitmap memory is a function of the position of the input template window within the first bitmap memory;

(e) storing, in a database memory associated with the programmable computer, occurrences of pixel combinations occurring within the input template window and corresponding occurrences of pixel combinations occurring within the output pattern window as the input template window is passed through a plurality of positions within the first bitmap memory; and (f) deriving, from the database memory, a set of template-pattern pairs which form the template-based filter, wherein each output pattern is representative of a pixel pattern to be generated in response to the detection of a pattern of pixels within a corresponding input template.

2. The method of claim 1 wherein the input template window is passed through all possible positions within the first bitmap memory.

3. The method of claim 1 wherein said storing step comprises:

creating an entry in the database memory, the entry including a field for representing the pixel pattern occurring within the template window, and a field for representing the pixel pattern occurring within the output pattern window;

repeating the previous step for each unique combination of pixel patterns occurring in the template and pattern windows to create a plurality of database entries.

4. The method of claim 3 wherein each database entry includes a field to record a frequency of occurrence of the combination of pixel patterns occurring in the template and pattern windows, further comprising the step of incrementing the frequency of occurrence field in a pre-existing database entry whenever a non-unique combination of pixel patterns occurring in the template and pattern windows is detected.

5. The method of claim 1 further including the step of repeating steps (a) through (e) therein for a plurality of training documents prior to deriving the template-pattern pairs at step (f).

6. A method performed in a programmable computer for automatically creating a template-based filter to be used for the filtering of an image bitmap, comprising the steps of:

(a) generating a first resolution image from a training document and storing the first resolution image in a first bitmap memory of the programmable computer;

(b) generating a second resolution image from the training document and storing the second resolution image in a second bitmap memory of the programmable computer;

(c) defining an input template window which may be passed through the first bitmap memory;

(d) defining an output pattern window which may be passed through the second bitmap memory, so that the position of the output pattern window within the second bitmap memory is a function of the position of the input template window within the first bitmap memory;

(e) storing, in a database memory associated with the programmable computer, occurrences of pixel combinations occurring within the input template window and corresponding occurrences of pixel combinations occurring within the output pattern window as the input template window is passed through a plurality of positions within the first bitmap memory, wherein said storing step includes creating an entry in the database memory, the entry including a field for representing the pixel pattern occurring within the template window, and a field for representing the pixel pattern occurring within the output pattern window, and repeating the previous step for each unique combination of pixel patterns occurring in the template and pattern windows to create a plurality of database entries; and (f) deriving, from the database memory, a set of template-pattern pairs which form the template-based filter, wherein each output pattern is representative of a pixel pattern to be generated in response to the detection of a pattern of pixels within a corresponding input template wherein said deriving step includes searching for conflicting database entries within the database memory, where conflicting database entries occur whenever a second plurality of database entries within the database memory have a common pattern in the template window field of each of the second plurality of database entries and a unique pattern in the output pattern window field of each of the second plurality of database entries, resolving the conflicting entries by selecting one of the conflicting entries to represent a desired entry, and eliminating all except for the desired entry from the database memory.

7. The method of claim 6 wherein the step of resolving the conflicting entries comprises selecting the conflicting entry having the maximum value in the frequency of occurrence field as the desired entry.

8. The method of claim 4 further comprising the step of reducing the size of the database by eliminating less frequently occurring template-pattern pair entries therefrom.

9. The method of claim 1 wherein the template window includes a plurality of non-contiguous pixel position therein.

10. The method of claim 1 further including the step of transferring the template-pattern pairs to a look-up table, so that each template corresponds to a unique location within the look-up table and upon addressing of a unique location the associated output pattern is generated by the look-up table.

11. The method of claim 1 wherein step (e), the step of storing occurrences of pixel combinations, stores all such occurrences.

12. A programmable computer comprising:

a first bitmap memory for storing a first resolution image generated from a training document;

a second bitmap memory for storing a second resolution image generated from the training document;

means for defining an input template window which may be passed through the first bitmap memory;

means for defining an output pattern window which may be passed through the second bitmap memory, so that the position of the output pattern window within the second bitmap memory is a function of the position of the input template window within the first bitmap memory;

a database memory for storing, in conjunction with the pixel combinations occurring within the input template window, corresponding occurrences of pixel combinations occurring within the output pattern window as the input template window is passed through a plurality of positions within the first bitmap memory; and the computer deriving, from the pixel combinations occurring within the input template window and corresponding occurrences of pixel combinations occurring within the output pattern window stored within the database memory, a set of template-pattern pairs which form the template-based filter, wherein each output pattern is representative of a pixel pattern to be generated in response to the detection of a pattern of pixels within a corresponding input template.

13. A method of operating a programmable computer having memory for storing image bitmaps, to create a template-based filter for use in the filtering of an image bitmap, the method comprising the steps of:

(a) generating a first resolution image from a training document and storing the first resolution image in a first bitmap memory;

(b) generating a second resolution image from the training document and storing the second resolution image in a second bitmap memory;

(c) defining an input template window which may be passed through the first bitmap memory;

(d) defining an output pattern window which may be passed through the second bitmap memory, so that the position of the output pattern window within the second bitmap memory is a function of the position of the input template window within the first bitmap memory;

(e) storing, in a database memory, occurrences of pixel combinations occurring within the input template window and corresponding occurrences of pixel combinations occurring within the output pattern window as the input template window is passed through a plurality of positions within the first bitmap memory; and (f) deriving, from the database memory, a set of template-pattern pairs which form the template-based filter, wherein each output pattern is representative of a pixel pattern to be generated in response to the detection of a pattern of pixels within a corresponding input template.

14. The method of claim 13 wherein said storing step comprises:

creating an entry in the database memory, the entry including a field for representing the pixel pattern occurring within the template window, and a field for representing the pixel pattern occurring within the output pattern window;

repeating the previous step for each unique combination of pixel patterns occurring in the template and pattern windows to create a plurality of database entries.

15. The method of claim 14 wherein each database entry includes a field to record a frequency of occurrence of the combination of pixel patterns occurring in the template and pattern windows, further comprising the step of incrementing the frequency of occurrence field in a pre-existing database entry whenever a non-unique combination of pixel patterns occurring in the template and pattern windows is detected.

16. A method of operating a programmable computer having memory for storing image bitmaps, to create a template-based filter for use in the filtering of an image bitmap, the method comprising the steps of:

(a) generating a first resolution image from a training document and storing the first resolution image in a first bitmap memory;

(b) generating a second resolution image from the training document and storing the second resolution image in a second bitmap memory;

(c) defining an input template window which may be passed through the first bitmap memory;

(d) defining an output pattern window which may be passed through the second bitmap memory, so that the position of the output pattern window within the second bitmap memory is a function of the position of the input template window within the first bitmap memory;

(e) storing, in a database memory, occurrences of pixel combinations occurring within the input template window and corresponding occurrences of pixel combinations occurring within the output pattern window as the input template window is passed through a plurality of positions within the first bitmap memory, wherein said storing step includes creating an entry in the database memory, the entry including a field for representing the pixel pattern occurring within the template window, a field for representing the pixel pattern occurring within the output pattern window, and a field to record a frequency of occurrence of the combination of pixel patterns occurring in the template and pattern windows, repeating the previous step for each unique combination of pixel patterns occurring in the template and pattern windows to create a plurality of database entries;

(f) incrementing the frequency of occurrence field in a pre-existing database entry whenever a non-unique combination of pixel patterns occurring in the template and pattern windows is detected; and (g) deriving, from the database memory, a set of template-pattern pairs which form the template-based filter, wherein each output pattern is representative of a pixel pattern to be generated in response to the detection of a pattern of pixels within a corresponding input template wherein said deriving step includes searching for conflicting database entries within the database memory, where conflicting database entries occur whenever a second plurality of database entries within the database memory have a common pattern in the template window field of each of the second plurality of database entries and a unique pattern in the output pattern window field of each of the second plurality of database entries, resolving the conflicting entries by selecting one of the conflicting entries to represent a desired entry, and eliminating all but the desired entry from the database memory.

17. The method of claim 16 wherein the step of resolving the conflicting entries comprises selecting the conflicting entry having the maximum value in the frequency of occurrence field as the desired entry.

18. The method of claim 13 further including the step of transferring the template-pattern pairs to a look-up table, so that each template corresponds to a unique location within the look-up table and upon addressing of a unique location the associated output pattern is generated by the look-up table.

* * * * *